United States Patent [19]

Pierson

[11] Patent Number: 5,069,236
[45] Date of Patent: Dec. 3, 1991

[54] METHOD AND APPARATUS FOR CLEANING DISKS

[75] Inventor: Eric D. Pierson, Lincoln, Nebr.

[73] Assignee: Pathway Systems, Inc., Manhattan, Mont.

[21] Appl. No.: 490,139

[22] Filed: Mar. 7, 1990

[51] Int. Cl.$^5$ .............................................. B08B 3/02
[52] U.S. Cl. .................................. 134/153; 134/902; 134/155; 134/157; 134/200; 134/99
[58] Field of Search ............... 134/902, 153, 143, 162, 134/200, 155, 157, 149, 99, 154

[56] References Cited

U.S. PATENT DOCUMENTS

| | | | |
|---|---|---|---|
| 3,378,394 | 4/1968 | David | 134/144 |
| 3,479,222 | 11/1969 | David et al. | 134/153 |
| 3,990,462 | 11/1976 | Elftmann et al. | 134/902 |
| 4,202,071 | 5/1980 | Scharpf | 134/153 |
| 4,300,581 | 11/1981 | Thompson | 134/902 |
| 4,489,740 | 12/1984 | Rattan et al. | 134/902 |
| 4,664,133 | 5/1987 | Silvernail et al. | 134/902 |
| 4,674,521 | 6/1987 | Paulfus | 134/902 |
| 4,682,614 | 7/1987 | Silvernail et al. | 134/902 |
| 4,982,753 | 1/1991 | Grebinski, Jr. et al. | 134/902 |

FOREIGN PATENT DOCUMENTS

| | | | |
|---|---|---|---|
| 0002163 | 1/1977 | Japan | 134/902 |
| 002164 | 1/1977 | Japan | 134/902 |

*Primary Examiner*—William A. Cuchlinski, Jr.
*Assistant Examiner*—William C. Dowling
*Attorney, Agent, or Firm*—Zarley, McKee, Thomte, Voorhees & Sease

[57] ABSTRACT

An apparatus for cleaning disks includes an enclosed housing with an operable door therein adapted to permit access to the interior of the housing. A rack is removably mounted within the housing, and will retain a plurality of disks in parallel spaced-apart relation within a disk-retaining cradle within the housing. The disk-retaining cradle is operably mounted so as to rotate about an axis passing through the centers of all of the disks. A spray bar projects within the housing and through all of the central openings in each of the disks, and has a plurality of spray nozzles therein to spray fluid radially outwardly therefrom to cover all of the disks, as they rotate in the cradle. A method for cleaning disks includes the initial step of providing a housing with an operable door and a cradle therein adapted to rotate a plurality of disks. The disks to be cleaned are then loaded in a rack which retains the disks in parallel spaced-apart orientation, which is loaded in the cradle within the housing. A spray arm within the housing projects through the central openings of the disks as the disks are loaded within the housing. Once the door is shut, the cradle is operated so as to rotate, thereby rotating all of the disks. Fluid is then sprayed from the spray arm onto the disks as they rotate.

5 Claims, 4 Drawing Sheets

METHOD AND APPARATUS FOR CLEANING DISKS

TECHNICAL FIELD

The present invention relates generally to apparatus for cleaning computer memory disks, and more particularly to a disk cleaning apparatus which spins the disks while applying a cleaner solution thereto.

BACKGROUND OF THE INVENTION

Rigid memory disks are one component of conventional computer hard disk subsystems. These disks must be cleaned and chemically treated during the various phases of manufacture and prior to assembly into the hard disk subsystem. Prior art methods of cleaning memory disks have been too slow, too small in capacity, or simply have not given acceptable results.

While spin-type rinser/dryer units are on the market, they are not designed for use with rigid memory disks, but rather for the processing of silicon wafers used in the manufacture of chips and integrated circuits. In general, such prior art rinser/dryer units are typically not sturdy enough to handle the rigors of disk processing. Thus, the disk manufacturer had to settle for a second rate adaptation of a tool not designed for disk processing.

One problem with prior art disk cleaning units, was that such units sprayed the cleaning solution from a manifold located along the edge of the disks towards the center of the disks, while the disks were rotating. Thus, centrifugal force would throw back dirty solution towards the manifold, contaminating the clean solution coming from the manifold.

Another problem with conventional disk cleaning units was the amount of time it required to complete a full clean/rinse/dry cycle. Because centrifugal force would throw solution back towards the spray manifold, a low RPM was required to obtain complete coverage of the solution on the disks. This low RPM thereby required large amounts of time to completely clean, rinse and spin dry the disks.

It is therefore a general object of the present invention to provide an improved disk cleaning apparatus and an improved method for cleaning rigid memory disks.

Another object of the present invention is to provide a disk cleaning apparatus which prevents contamination of cleaning solution being applied to the disks.

A further object is to provide a disk cleaning apparatus which reduces the time necessary to complete a clean/rinse/dry cycle, as compared to conventional disk cleaning units.

Still another object of the present invention is to provide a method for cleaning rigid disks which prevents the use of contaminated cleaning solution during the wash and rinse cycles of the apparatus.

Yet a further object is to provide a method for cleaning disks which permits 100 percent spray coverage of the disks.

Another object of the present invention is to provide a disk cleaning apparatus which is economical to manufacture, simple to use, and refined in appearance.

These and other objects of the present invention will be apparent to those skilled in the art.

SUMMARY OF THE INVENTION

The apparatus for cleaning disks of the present invention includes an enclosed housing with an operable door therein adapted to permit access to the interior of the housing. A rack is removably mounted within the housing, and will retain a plurality of conventional memory disks in parallel spaced-apart relation within a disk-retaining cradle within the housing. The disk-retaining cradle is operably mounted so as to rotate about an axis passing through the centers of all of the disks. A spray bar projects within the housing and through all of the central openings in each of the disks, and has a plurality of spray nozzles therein to spray fluid radially outwardly therefrom to cover all of the disks, as they rotate in the cradle.

The method for cleaning disks of the present invention includes the initial step of providing a housing with an operable door and a cradle therein adapted to rotate a plurality of disks. The disks to be cleaned are then loaded in a rack which retains the disks in parallel spaced-apart orientation, which is loaded in the cradle within the housing. A spray arm within the housing projects through the central openings of the disks as the disks are loaded within the housing. Once the door is shut, the cradle is operated so as to rotate, thereby rotating all of the disks. Fluid is then sprayed from the spray arm onto the disks as they rotate.

DESCRIPTION OF THE PREFERRED EMBODIMENT

Figure 2:
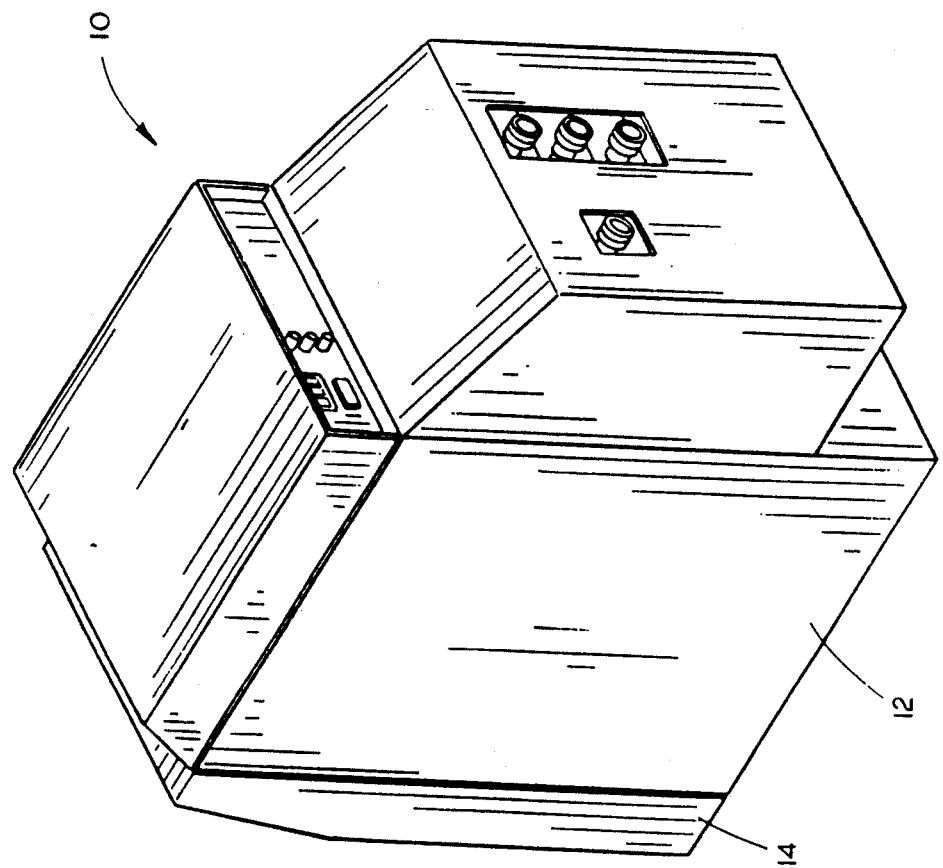
FIG. 2 is a rearward perspective view of the invention.
Figure 1:
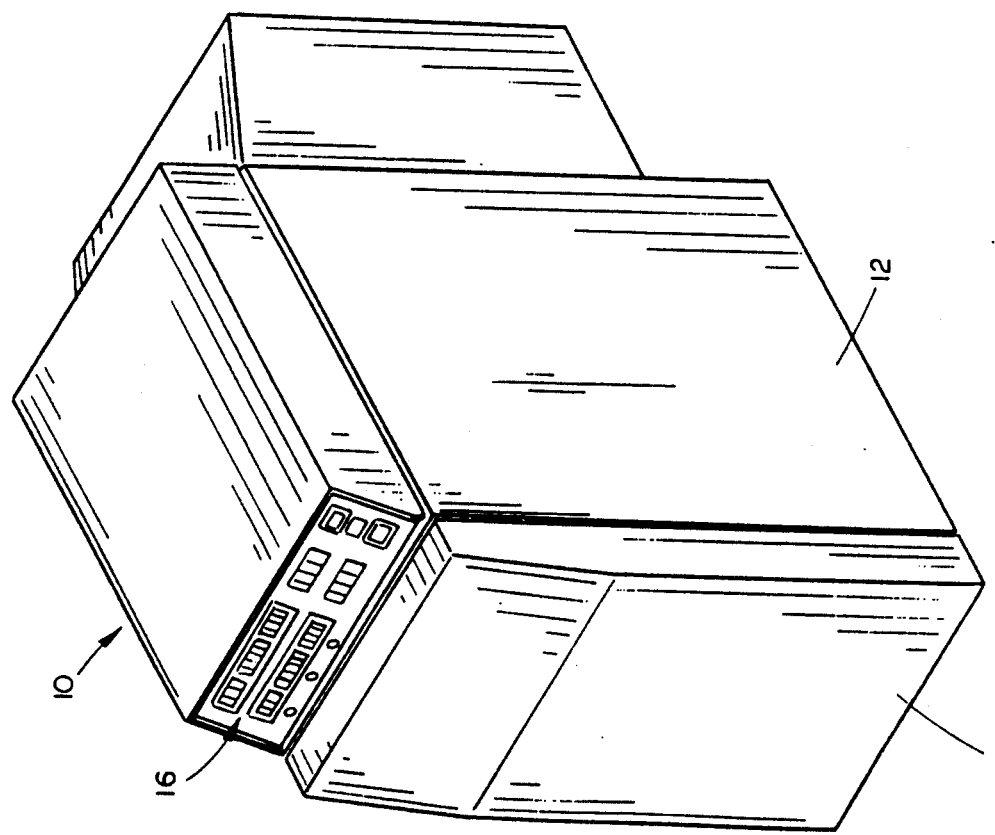
FIG. 1 is a front perspective view of the disk cleaning apparatus of the present invention.

Referring now to the drawings, in which identical or corresponding parts are identified with the same reference numeral, the disk cleaning apparatus of the present invention is designated generally at 10 and includes a housing 12, an operable front door 14 and a control panel 16.

Housing 12 includes a pair of vertical side walls 18 and 20, a front wall 22, rear wall 24, top wall 26 and bottom wall 28. Front door 14 has a front face 30 and a rearward face 32, with a pair of rigid arms 34 projecting horizontally and rearwardly from rear face 32. Arms 34 are channel members, each being slidably mounted on a support strap 36 with housing 12, such that door 14 is slidable towards, and away from, front wall 22 of housing 12. A pair of dual action pneumatic cylinders 38 are mounted parallel and adjacent to support straps 36 in housing 12, and have their push rods 40 connected to front door 14 such that operation of these cylinders will open or close front door 14.

Figure 4:
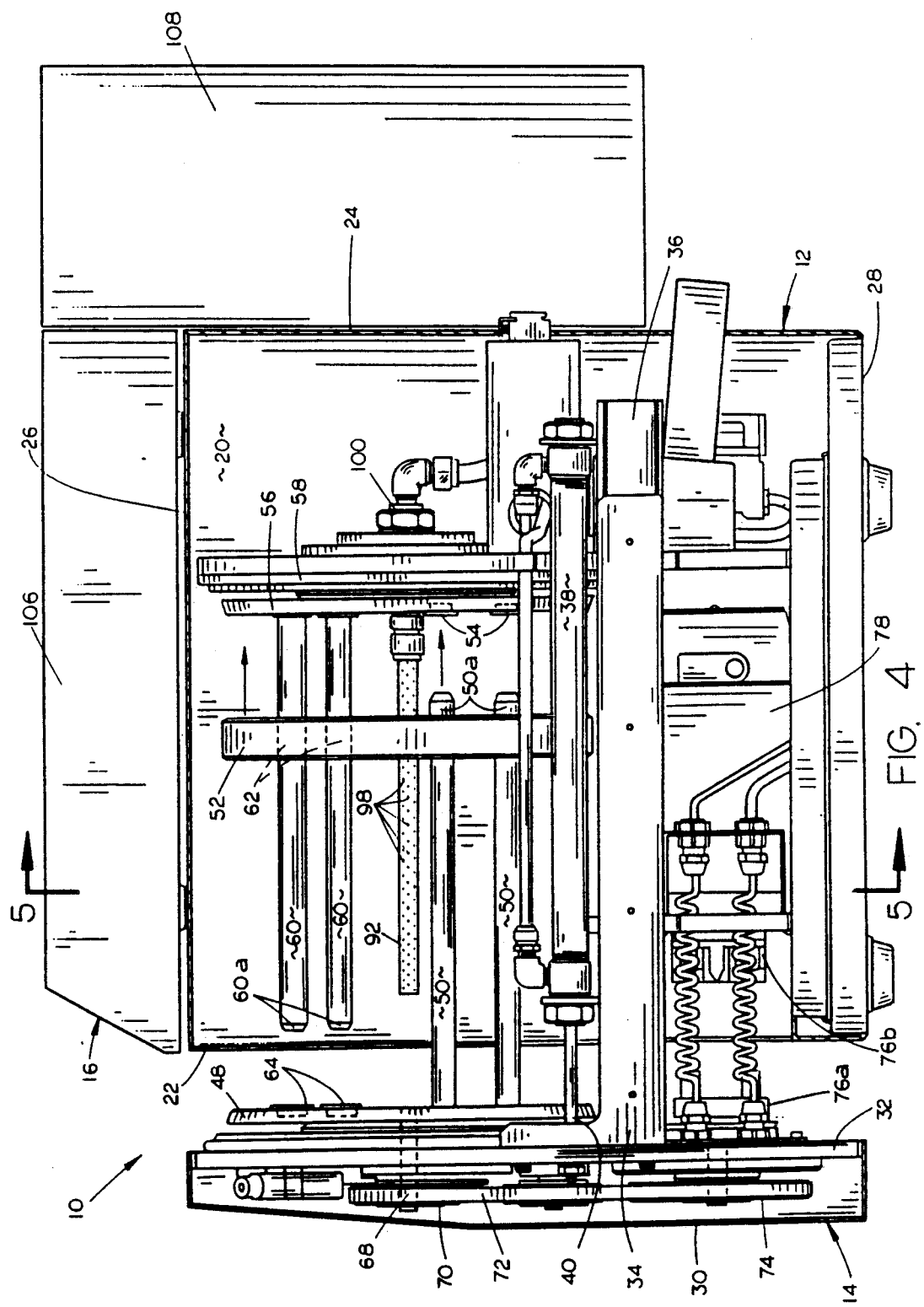
FIG. 4 is a sectional view taken at lines 4—4 in FIG. 3.

A rotatable cradle is designated generally at 42, and will receive a disk rack 44 which retains a plurality of rigid memory disks 46 therein. Cradle 42 will rotate about a longitudinal axis so as to spin disks 46 within housing 12. Cradle 42 includes a circular forward plate 48 rotatably mounted to the rearward surface 32 of front door 14. A series of four projecting arms 50 are mounted in parallel spaced apart orientation around the circumference of the lower half of plate 48, arms 50 each being equidistant from the axis of rotation of plate 48. A circular guide plate 52 is mounted coaxial to forward plate 48 adjacent the free ends of arms 50, as shown in FIG. 4. The free ends 50a of arms 50 project slightly through guide plate 52 so as to be journaled within receiving apertures 54 in a circular rearward plate 56, to be described in more detail hereinbelow. Guide plate 52 is mounted on arms 50 for movement therewith.

Rearward plate 56 is rotatably mounted to an interior wall 58 within housing 12, coaxial with guide plate 52 and forward plate 48. Four projecting arms 60, which are parallel and spaced apart, project horizontally from rearward plate 56 along the circumference of the upper half thereof. Arms 56 and arms 50 are all radially equidistant from the axis of rotation of forward and rearward plates 48 and 56. Arms 60 are slidably mounted through apertures 62 in guide plate 52, and are aligned with receiving apertures 64 in forward plate 48.

Figure 3:
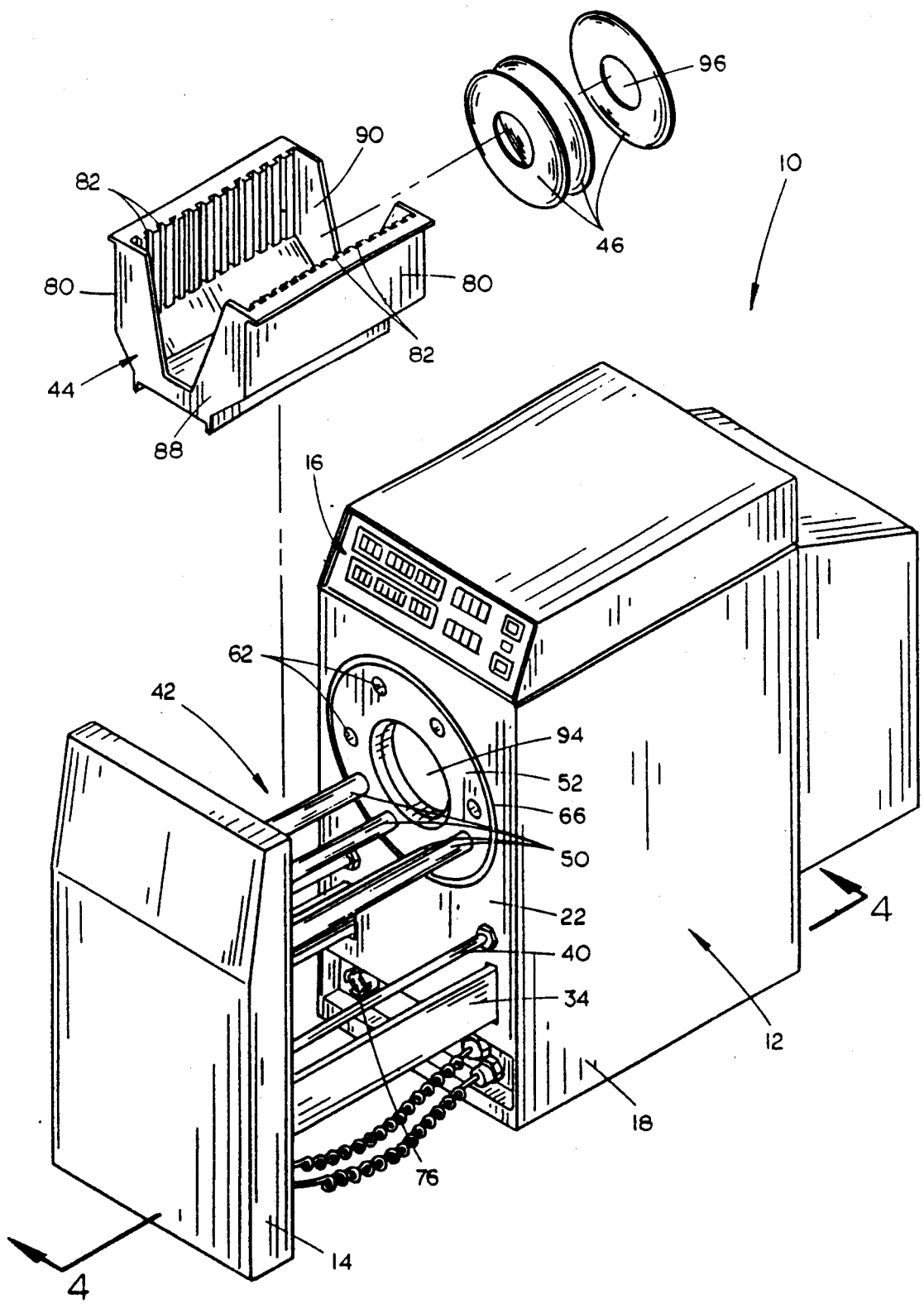
FIG. 3 is a front perspective view with the loading door extended and the disks and disk rack shown in exploded perspective.

Referring now to FIG. 3, a large circular opening 66 is formed in front wall 22 of housing 12, which will allow guide plate 52 to pass therethrough. In FIG. 3, front door 14 is in a fully open position with guide plate 52 located within opening 66. When door 14 is retracted to a closed position, guide plate 52 will slide along arms 60 (see FIG. 4) until the free ends 50a of arms 50 are journaled within receiving apertures 54 in rearward plate 56, and the free ends 60a of arms 60 are journaled within receiving aperture 64 in forward plate 48. Thus, when door 14 is in the closed position, a generally cylindrical cage is formed by arms 50 and 60 which will rotate on its longitudinal axis.

In the preferred embodiment of the invention, forward plate 48 is mounted on a rotatable shaft 68 projecting within door 14. An upper pulley 70 is mounted to shaft 68, and is rotated via drive belt 72 by a lower pulley 74. Lower pulley 74 is connected to one-half 76a of a drive coupler projecting from the rearward face 32 of door 14. The rearward half 76b of the drive coupler is operably mounted to a motor 78 within housing 12, so that when door 14 is retracted to its closed position, forward and rearward halves 76a and 76b of the drive coupler intermesh so as to convey power from motor 78 to forward plate 48 of cradle 42.

Figure 5:
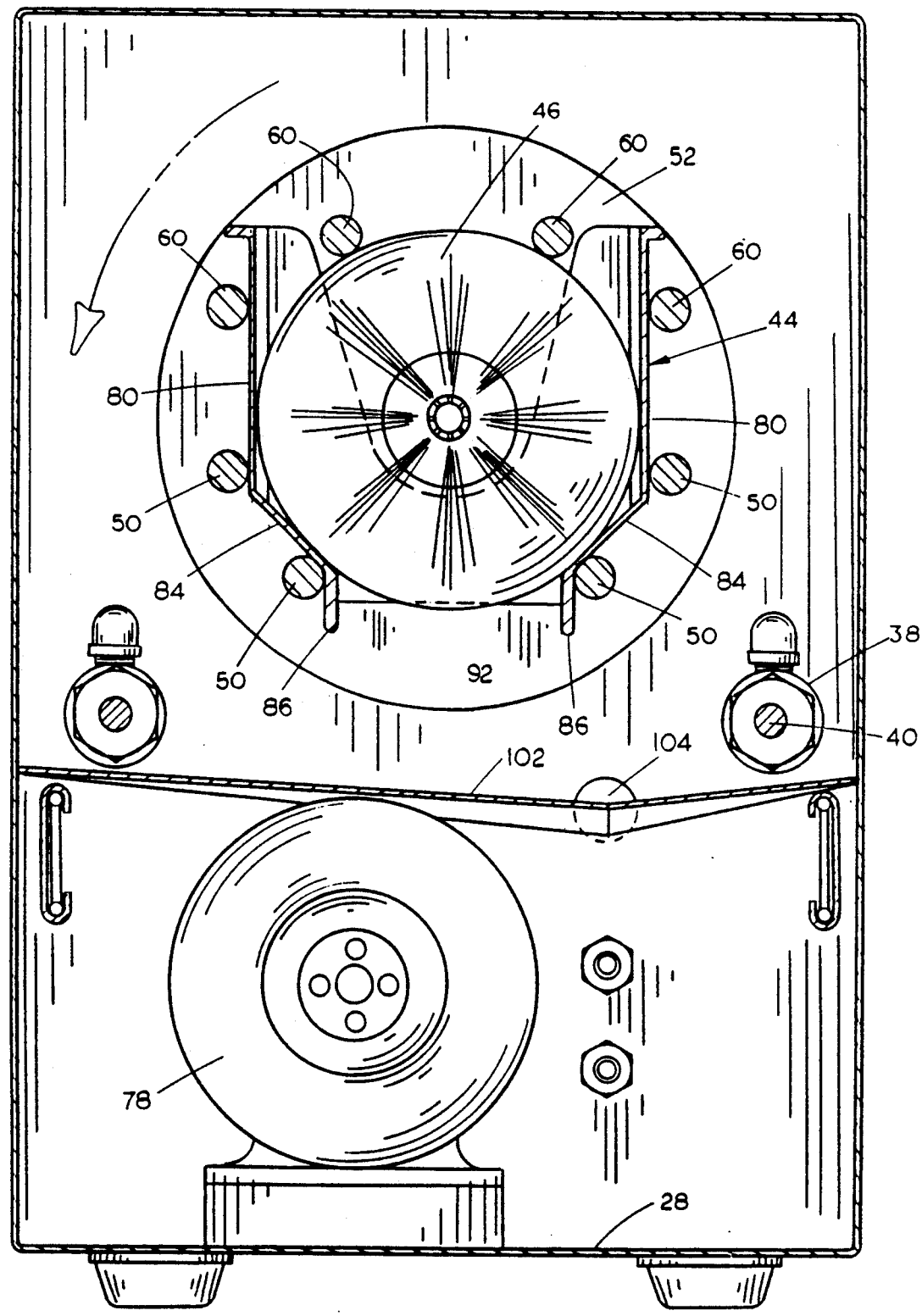
FIG. 5 is a sectional view taken at lines 5—5 in FIG. 4.

Referring now to FIGS. 3 and 5, disk rack 44 includes a pair of vertical spaced apart side walls 80 having a plurality of slots 82 formed along their inner surfaces. Slots 82 on each side wall 80 are aligned so as to receive a disk 46 therein, and retain a plurality of disks 46 in a parallel spaced apart vertical orientation. Disks 46 will rest against a short sloped bottom wall 84 depending from each side wall 80. Disk rack 44 has an open bottom to allow fluid to drain therefrom. A pair of legs 86 depend from the lower edge of sloped bottom walls 84, and are spaced apart a distance to fit between the two lowermost arms 50 of cradle 42, as shown in FIG. 5. Thus, disk rack 44 will be supported in cradle 42 with the two lowermost arms 50 supporting sloped bottom walls 84, and the other pair of arms 50 and one pair of arms 60 adjacent side walls 80. The front and rearward panels 88 and 90 of disk rack 44 have a generally V-shaped notch therein to allow the uppermost pair of arms 60 of cradle 42 to extend therethrough (see FIG. 5). The V-shaped notches in forward and rearward panels 88 and 90 extend downwardly beyond the center of disks 46, for a purpose to be described in more detail hereinbelow.

One of the main problems with the spin-type disk cleaning units in the prior art was in the contamination of the cleaning solution as it was thrown back at the spray manifold from the centrifugal force of the spinning disks. The inventor herein has overcome this problem by locating a single spray arm 92 at the center of the rotational axis of cradle 42 and disks 46. Spray arm 92 extends from interior wall 58, through rearward plate 56 and thence through a central opening 94 in guide plate 52 and through a central opening 96 in each disk 46, to a point adjacent the front wall 22 of housing 12. Spray arm 92 has a plurality of small openings 98 spaced longitudinally and radially around the entire surface thereon. Spray arm 92 is fluidly connected to a source of fluid via a conventional fitting 100 so as to provide the appropriate type of fluid for cleaning or rinsing disks 46.

A sloped floor 102 is mounted above motor 78 and below cradle 42 to collect and drain all fluid from spray arm 92 to a drain opening 104 (see FIG. 5). The drained fluid may then be recirculated or disposed of as desired.

In operation, front door 14 is opened by extending push rods 40 of pneumatic cylinders 38. Disks 46 are then loaded into disk rack 44 which in turn is placed on arms 50 of cradle 42. Pneumatic cylinders 38 are then activated to retract push rods 40 and close door 14. Simultaneously, arms 60 extending from rearward plate 56 will project through guide plate 52 into receiving apertures 64 on forward plate 48. A pair of arms 60 will be located directly adjacent the upper edge of disks 46, as shown in FIG. 5. Utilizing control panel 16, disk cleaning apparatus 10 is activated so as to spin cradle 42. The "wash" cycle of the apparatus will spray cleaning fluid from spray arm 92 while cradle 42 spins, so that the cleaning fluid is sprayed on to the surfaces of the disks 46 and is thrown from the disks by centrifugal force. All cleaning fluids are drained through drain opening 104.

Spray arm 92 is then connected to a source of rinsing fluid to rinse disks 46, the fluid again being drained through drain opening 104. Because the disks may be spun at a high RPM, the drying cycle is must shorter than the dry cycle of conventional disk cleaning apparatus. Once the appropriate amount of time has passed for the dry cycle to occur, the rotation of cradle 42 is stopped, and door 14 is again opened.

It should be noted that no details have been shown of the control panel housing 106 resting atop housing 12, nor of the connection box 108 mounted to the rearward wall 24 of housing 12. Any conventional connections and control means may be utilized with the apparatus of the present invention.

Whereas the invention has been shown and described in connection with the preferred embodiment thereof, it will be understood that many modifications, substitutions and additions may be made which are within the intended broad scope of the appended claims. Thus, there has been shown and described an improved disk cleaning apparatus and method for using the same, which accomplishes at least all of the above-stated objects.

I claim:

1. An apparatus for cleaning disks, the disks being of the type having a central opening therethrough comprising: an enclosed housing;

a door in said housing operable between open and closed positions to permit access to the interior of said housing;

disk retaining means operably mounted in said housing and operable to rotate a plurality of disks about a longitudinal axis perpendicular to the disks and passing through their centers;

spray arm means mounted within said housing and projecting generally coaxial with the rotational axis of said disk retaining means for spraying fluid on said disks.

2. The disk cleaning apparatus of claim 1, wherein said spray arm includes a plurality of openings arranged therein to direct a spray of fluid uniformly outwardly from the entire circumference of the arm.

3. The disk cleaning apparatus of claim 2, wherein said spray arm openings are arranged longitudinally along said arm from end to end, to uniformly spray fluid on all disks within said housing.

4. The disk cleaning apparatus of claim 1, further comprising a rack removably connected to said disk-retaining means, for retaining a plurality of disks in generally parallel, spaced-apart orientation aligned along a single axis.

5. The disk cleaning apparatus of claim 4, wherein said rack has openings therethrough to permit fluid to escape therefrom.

* * * * *